(12) United States Patent
Sung et al.

(10) Patent No.: US 8,568,674 B1
(45) Date of Patent: Oct. 29, 2013

(54) DIESEL OXIDATION CATALYST COMPOSITES

(75) Inventors: Shiang Sung, New York, NY (US);
Stanley A. Roth, Yardley, PA (US);
Claudia Wendt, Hannover (DE);
Susanne Stiebels, Adenbuttel (DE);
Helke Doering, Aurich (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 13/571,996

(22) Filed: Aug. 10, 2012

(51) Int. Cl.
*B01D 53/94* (2006.01)
*B01J 23/40* (2006.01)
*F01N 3/10* (2006.01)
*F01N 3/28* (2006.01)

(52) U.S. Cl.
USPC ....... 423/213.2; 423/213.5; 502/60; 502/325; 502/527.12; 60/299

(58) Field of Classification Search
USPC ......... 423/213.2, 213.5; 502/60, 325, 527.12; 60/299
See application file for complete search history.

(56) References Cited

U.S. PATENT DOCUMENTS

| | | | |
|---|---|---|---|
| 4,329,162 A | 5/1982 | Pitcher, Jr. | |
| 4,335,023 A | 6/1982 | Dettling et al. | |
| 6,171,556 B1 | 1/2001 | Burk et al. | |
| 7,576,031 B2 | 8/2009 | Beutel et al. | |
| 7,922,987 B2 | 4/2011 | Koegel et al. | |
| 7,977,275 B2 | 7/2011 | Pfeifer et al. | |
| 2005/0266988 A1 | 12/2005 | Doumeki et al. | |
| 2009/0320449 A1 | 12/2009 | Beutel et al. | |
| 2010/0166629 A1 | 7/2010 | Deeba | |
| 2010/0180581 A1 | 7/2010 | Grubert et al. | |
| 2010/0180582 A1 | 7/2010 | Mueller-Stach et al. | |
| 2010/0183490 A1* | 7/2010 | Hoke et al. ................. | 423/213.5 |
| 2010/0186375 A1 | 7/2010 | Kazi et al. | |
| 2010/0221154 A1 | 9/2010 | Lee et al. | |
| 2010/0257843 A1 | 10/2010 | Hoke et al. | |
| 2010/0290964 A1 | 11/2010 | Southward et al. | |
| 2010/0319332 A1 | 12/2010 | Jeske et al. | |
| 2011/0099975 A1 | 5/2011 | Bailey et al. | |
| 2011/0143921 A1 | 6/2011 | Hao et al. | |
| 2012/0055141 A1 | 3/2012 | Hilgendorff | |
| 2012/0110988 A1 | 5/2012 | Dotzel et al. | |

FOREIGN PATENT DOCUMENTS

| | | |
|---|---|---|
| JP | 59052530 | 3/1984 |
| JP | 10244167 | 9/1998 |
| JP | 2000257512 | 9/2000 |
| WO | WO-2009/074308 | 6/2009 |
| WO | WO-2011/057649 | 5/2011 |
| WO | WO-2011/127095 | 10/2011 |
| WO | WO-2012/029050 | 3/2012 |

* cited by examiner

*Primary Examiner* — Timothy Vanoy
(74) *Attorney, Agent, or Firm* — Melanie L. Brown

(57) ABSTRACT

Oxidation catalyst composites for the treatment of exhaust gas emissions, such as the abatement of unburned hydrocarbons (HC), and carbon monoxide (CO) and the oxidation of NO to $NO_2$ are disclosed The catalyst composites comprise two washcoat layers containing two different compositions of platinum group metals to optimize the $NO_2$ exiting the catalyst composite. The key to improvement in NO oxidation is to have one catalyst layer that contains Pt while being substantially free of Pd. Methods and systems utilizing the catalyst composites are also disclosed.

23 Claims, 4 Drawing Sheets

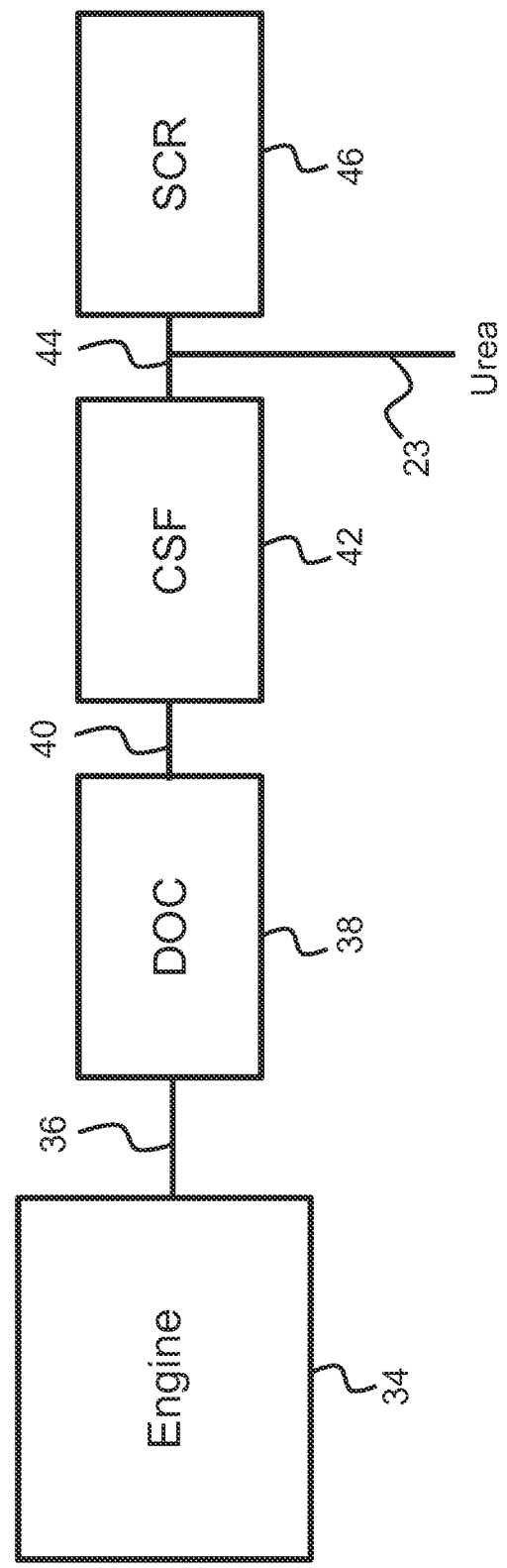

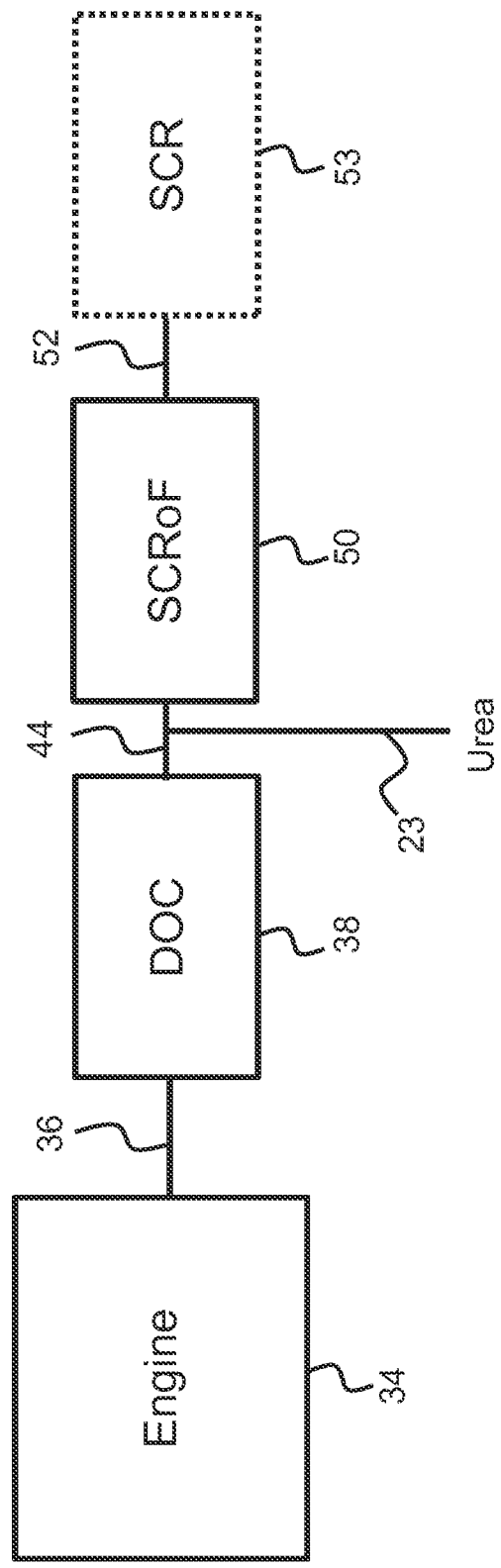

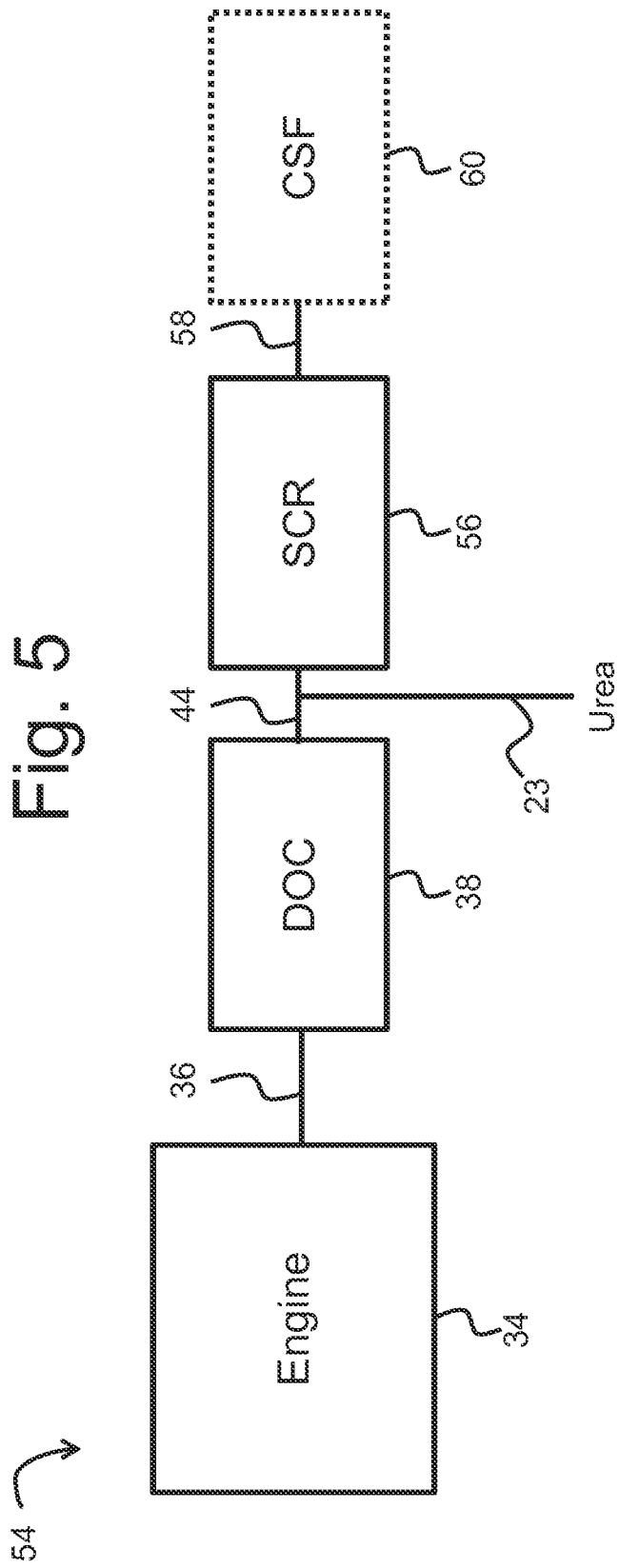

DIESEL OXIDATION CATALYST COMPOSITES

TECHNICAL FIELD

The present invention pertains generally to layered catalysts used to treat gaseous steams containing hydrocarbons, carbon monoxide, and oxides of nitrogen. More specifically, this invention is directed to lean burn oxidation catalyst composites having multiple layers; for example, two layers of material.

BACKGROUND

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Emissions of lean burn engines include particulate matter (PM), nitrogen oxides ($NO_x$), unburned hydrocarbons (HC) and carbon monoxide (CO). $NO_x$ is a term used to describe various chemical species of nitrogen oxides, including nitrogen monoxide (NO) and nitrogen dioxide ($NO_2$), among others.

Oxidation catalysts comprising a precious metal dispersed on a refractory metal oxide support are known for use in treating the exhaust of diesel engines to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters, which are placed in the exhaust flow path from a Diesel-powered engine to treat the exhaust before it vents to the atmosphere. Typically, the diesel oxidation catalysts are formed on ceramic or metallic substrate carriers (such as the flow-through monolith carrier, as described herein below) upon which one or more catalyst coating compositions are deposited. In addition to the conversions of gaseous HC, CO and particulate matter, oxidation catalysts that contain platinum group metals (which are typically dispersed on a refractory oxide support) promote the oxidation of nitric oxide (NO) to $NO_2$.

One important factor in DOC design is catalyst-deactivation following high temperature exposure. Thermally induced DOC deactivation can occur as a result of sintering of the catalytic component or carrier. Sintering of the catalytic component involves coalescence or crystallite growth of catalytic sites, which are initially well-dispersed. This aggregation results in a loss of surface to volume ratio, reducing catalytic performance. Alternatively, exposure of the DOC to high temperatures can result in sintering of the catalytic carrier. This involves a loss of the carrier pore structure that causes loss of accessibility to catalytic active sites.

As emissions regulations become more stringent, there is a continuing need to develop diesel oxidation catalyst (DOC) systems that provide improved performance, for example, improved $NO_2$ formation at the DOC, which will improve overall performance of the lean burn engine emissions system.

SUMMARY

Aspects of the invention include compositions of diesel oxidation catalysts, methods and systems for treating exhaust gas from lean burn engines. Embodiments of the invention are useful for, but not limited to, converting $NO_x$, CO, and HC from engine exhaust. One aspect of the invention relates to an oxidation catalyst for abatement of exhaust gas emissions from a lean burn engine comprising a carrier substrate having a length, an inlet end and an outlet end, an oxidation catalyst catalytic material on the carrier, the oxidation catalyst catalytic material including a bottom washcoat layer and a top washcoat layer. The bottom washcoat layer comprising a platinum (Pt) component and a palladium (Pd) component in weight ratio of Pt to Pd in the range of about 4:1 to 1:4; the top washcoat layer comprising a zeolite, Pt and a refractory metal oxide support, the top washcoat layer being substantially free of palladium. The oxidation catalyst composite of this aspect of the invention is effective to abate hydrocarbons and carbon monoxide, and is also effective for the oxidation of NO to $NO_2$ in a lean burn engine. In some embodiments, the top washcoat is substantially free of barium and the bottom washcoat layer is substantially free of zeolite. In other embodiments, the refractory metal oxide support comprises silica-alumina. The top washcoat layer of various embodiments comprises a Pt component in an amount in the range of about 10 $g/ft^3$ to 120 $g/ft^3$. In one or more other embodiments, the bottom washcoat layer comprises a Pt component in an amount in the range of about 5 $g/ft^3$ to 85 $g/ft^3$ and comprises a Pd component in an amount in the range of about 5 $g/ft^3$ to 50 $g/ft^3$. In some embodiments, the top washcoat layer contains a higher loading of platinum group metals that the bottom washcoat layer to maximize NO oxidation. In further embodiments, the composite contains a weight ratio of platinum group metal in the top layer to the bottom layer in the range of 1:1 to 4:1. In other embodiments, the top washcoat comprises platinum in the range of about 60 to 120 $g/ft^3$ and the bottom washcoat layer comprises platinum and palladium in a weight ratio of about 1:4 to 1:1. In one or more embodiments, the oxidation catalyst is adapted to maximize CO and HC oxidation, wherein the top washcoat layer contains a lower loading of platinum group metals than the bottom washcoat layer. In various embodiments the composite contains a weight ratio of platinum group metal in the top layer to the bottom layer in the range of 1:4 to 1:1 to promote oxidation of hydrocarbons and carbon monoxide while still providing for at least 30% NO oxidation. In some embodiments, the top washcoat comprises platinum in the range of about 10 to 60 $g/ft^3$ and the bottom washcoat layer comprises platinum and palladium in a ratio in the range of about 1:1 to 4:1 platinum to palladium by weight.

In one or more embodiments, the invention relates to an oxidation catalyst composite for abatement of exhaust gas emissions from a lean burn engine comprising a carrier substrate having a length, an inlet end and an outlet end, an oxidation catalyst catalytic material on the carrier, the oxidation catalyst catalytic material including a bottom washcoat and a top washcoat. The bottom washcoat comprising a refractory metal oxide support, a platinum (Pt) component and palladium (Pd) component in the weight ratio of Pt to Pd in the range of about 9:1 to 1:4. The top washcoat layer comprising a zeolite, a refractory metal oxide support, a platinum component (Pt) and palladium component (Pd) in the weight ratio of Pt to Pd in the range of about 1:1 to 100:1. The oxidation catalyst composite being effective to abate hydrocarbon and carbon monoxide, and oxidize NO to $NO_2$ in the lean burn engine exhaust. In some embodiments, the top washcoat further comprises barium oxide in the range of about 3-30 $g/ft^3$. In various embodiments the top washcoat layer contains a lower loading of platinum group metals than the bottom washcoat layer to maximize CO and HC oxidation.

In one or more embodiments, the invention relates to a catalyst composite for abatement of exhaust gas emissions from a lean burn engine comprising a carrier substrate having a length, an inlet end and an outlet end, an oxidation catalyst catalytic material on the carrier, the oxidation catalyst catalytic material including a bottom washcoat layer and a top washcoat layer. The top washcoat layer comprising a refractory metal oxide, zeolite and a platinum component (Pt) and a palladium component (Pd) in a weight ratio of Pt to Pd in the range of about 9:1 to 1:4. The bottom washcoat layer comprising Pt and a refractory metal oxide support, the oxidation catalyst composite being effective to abate hydrocarbon and carbon monoxide, and oxidize NO to $NO_2$ in the lean burn engine exhaust. In various embodiments, the bottom washcoat layer is substantially free of palladium and substantially free of barium. In some embodiments, the bottom washcoat layer further comprises a palladium component, the platinum component and palladium component present in a weight ratio of Pt to Pd in the range of about 1:1 to 100:1. In further embodiments, the bottom washcoat layer further comprises barium oxide in the range of about 3-30 $g/ft^3$.

Another aspect of the invention refers to a method of treating exhaust gas from a lean burn engine comprising flowing the exhaust gas through a honeycomb substrate comprising a bottom washcoat layer comprising a platinum (Pt) component and a palladium (Pd) component in weight ratio of Pt to Pd in the range of about 4:1 to 1:4; and a top washcoat layer comprising a zeolite, Pt and a refractory metal oxide support, the top washcoat layer being substantially free of palladium, wherein the diesel oxidation catalyst is effective to abate CO and HC, and oxidize NO to $NO_2$ from the exhaust gas stream. In various embodiments, the top washcoat of the oxidation catalyst composite is substantially free of Ba and the bottom washcoat is substantially free of zeolite. In one or more embodiments, the refractory metal oxide support comprises silica-alumina oxides.

Another aspect of the invention refers to a system for treatment of a lean burn engine exhaust gas emission including hydrocarbons, carbon monoxide, and other exhaust components. The emission treatment system comprising an exhaust conduit in fluid communication with the lean burn engine via an exhaust manifold; the oxidation catalyst composite of one or more embodiments of the invention, wherein the carrier substrate is a flow through substrate or a wall-flow substrate; and a catalyzed soot filter and an SCR catalyst composition are located downstream from the oxidation catalyst composite. In one or more embodiments the SCR catalyst composition is loaded on the catalyzed soot filter. In some embodiments, the SCR catalyst composition comprises a copper promoted small pore zeolite with 8 member ring openings. In further embodiments, the small pore zeolite has the CHA structure.

BRIEF DESCRIPTION OF THE DRAWINGS

FIG. 3 is a schematic of an engine emission treatment system, in accordance with an embodiment of the present invention;

FIG. 4 is a schematic of an engine treatment system, in accordance with an embodiment of the present invention; and FIG. 5 is a schematic of an engine treatment system, in accordance with an embodiment of the present invention.

DETAILED DESCRIPTION

Figure 1:
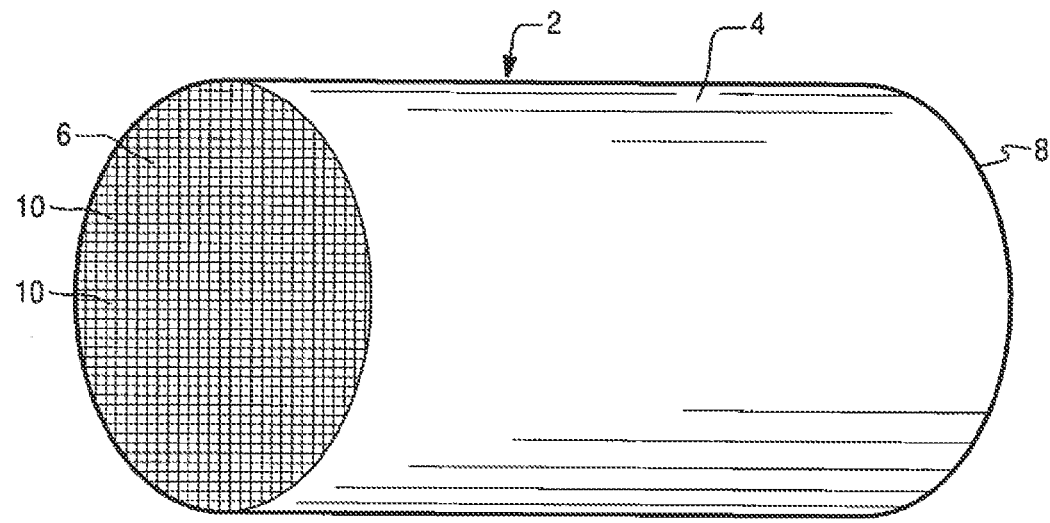
FIG. 1 is a perspective view of a honeycomb-type refractory carrier member which may comprise a novel diesel oxidation catalyst (DOC) washcoat composition in accordance with the present invention.

Provided are lean burn (e.g. diesel) catalyst composites, systems and methods. In one or more embodiments, the catalyst composite comprises two washcoat layers: a bottom washcoat layer comprising platinum and palladium and refractory metal oxide support; and a top washcoat layer comprising a zeolite, platinum and refractory metal oxide support. In one or more embodiments, the top washcoat layer is substantially free of palladium. Providing the separate washcoat layers is intended to enhance $NO_2$ formation without an excessive loss in CO conversion. It has been found that minimizing and/or eliminating palladium from the top washcoat provides enhanced $NO_2$ formation in aged catalyst composites that experience aging when placed in an exhaust gas system of a lean burn engine. In addition, altering the platinum to palladium ratio in the bottom coat of the catalytic material can further enhance $NO_2$ formation while minimizing loss in CO and HC conversion in aged catalyst composites.

Another aspect of the invention provides methods for treating lean burn engine exhaust gas stream emissions containing unburned hydrocarbons (HC) and carbon monoxide (CO). An exhaust gas stream from a diesel engine can be treated with the catalyst composite described herein and provide for enhanced $NO_2$ content in the exhaust gas exiting the catalyst composite.

In accordance with embodiments of the present invention, each layer of the catalyst composite has a different platinum group metal composition. Platinum is substantially the only platinum group metal present in the first layer (the first or top washcoat layer), while both Pt and Pd are present in the second layer (the second or bottom washcoat layer). A high amount of Pt in the top washcoat layer improves the sulfur tolerance while enhancing $NO_2$ formation. The top washcoat layer contains a hydrocarbon (HC) storage component, e.g. a zeolite, to store HCs during the cold start period of the drive cycle. After warm-up of the catalyst, the hydrocarbon (HC) storage component will release the stored HCs which are subsequently converted over the catalyst. In some embodiments, the top washcoat layer is essentially free of barium or $NO_x$ storage compounds. In embodiments where barium is present in the top washcoat, barium oxide may be present in amount between about 3 and 30 $g/ft^3$. According to one or more embodiments, the top washcoat contains an amount of Pt in the range of about 10 to 140 $g/ft^3$, and in specific embodiments, about 10 to 100 $g/ft^3$.

The second or bottom washcoat layer may contain Pt and Pd. In one or more embodiments, the bottom washcoat layer has a Pt:Pd weight ratio of less than about 10:1, but greater than about 1:4, for example in the range of about 4:1 to 1:4. Also, exemplified are Pt:Pd ratios of about 1:4, about 1:1, or about 2.5:1 and 9:1. In specific embodiments, a minimum bottom washcoat Pt:Pd weight ratio of 2.5:1 is provided to maximize $NO_2$ formation, while minimizing loss of CO conversion. In some embodiments, the bottom washcoat does not contain any HC storage materials (e.g. a zeolite) to prevent the sintering of PGM on the zeolite. In some embodiments, the bottom washcoat contains barium to stabilize the silica-alumina washcoat against high temperature aging.

Reference to a catalyst composite means a catalytic article including a carrier substrate, for example a honeycomb substrate, having one or more washcoat layers containing a catalytic component, for example, a platinum group metal component that is effective to catalyze the oxidation of HC, CO and/or $NO_x$.

Reference to "essentially no," "essentially free," and "substantially free" means that the material recited may be intentionally provided in the recited layer, or unintentionally migrate/diffuse to the recited layer, in minor amounts (that is <10% by weight of the washcoat, 9%, 8%, 7%, 6%, 5%, 4%, 3%, 2%, or even 1%).

Reference to "substantially free of palladium" means that the recited material may be intentionally or unintentionally present in the recited layer in minor amounts (that is <10% by weight of the platinum group metal in that washcoat, 9%, 8%, 7%, 6%, 5%, 4%, 3%, 2%, or even 1%). Reference to "substantially free of barium" means that the recited material may be intentionally or unintentionally present in the recited layer in minor amounts (that is <2% by weight of the washcoat).

Reference to a percentage of platinum group metal by dry weight (e.g. "–2.8% by dry weight") refers to the fraction of platinum group metal on the refractory metal oxide support.

High surface-area refractory metal oxide supports refer to support particles having pores larger than 20 Å and a wide pore distribution. As defined herein, such metal oxide supports exclude molecular sieves, specifically, zeolites. High surface area refractory metal oxide supports, e.g., silica-alumina support materials, also referred to as "silica-alumina oxides" typically exhibit a BET surface area in excess of 60 square meters per gram ("$m^2/g$"), often up to about 200 $m^2/g$ or higher. Such silica-alumina usually comprises a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, silica zirconia, alpha alumina, titania, silica titania, and other materials are known for such use. Although many of these materials suffer from the disadvantage of having a considerably lower BET surface area than activated alumina, that disadvantage tends to be offset by a greater durability of the resulting catalyst. "BET surface area" has its usual meaning of referring to the Brunauer, Emmett, Teller method for determining surface area by $N_2$ adsorption. Pore diameter and pore volume can also be determined using BET-type $N_2$ adsorption. Desirably, the active alumina has a specific surface area of 60 to 350 $m^2/g$, and typically 90 to 250 $m^2/g$. The washcoat loading of the refractory oxide support on the monolith is preferably from about 0.1 to about 6 $g/in^3$, more preferably from about 2 to about 5 $g/in^3$ and most preferably from about 2 to about 4 $g/in^3$.

As used herein, molecular sieves, such as zeolites, refer to materials, which may in particulate form support catalytic platinum group metals, the materials having a substantially uniform pore distribution, with the average pore size being no larger than 20 Å. Reference to a "non-zeolite-support" in a catalyst layer refers to a material that is not a molecular sieve or zeolite and that receives precious metals, stabilizers, promoters, binders, and the like through association, dispersion, impregnation, or other suitable methods. Examples of such supports include, but are not limited to, high surface area refractory metal oxides. One or more embodiments of the present invention include a high surface area refractory metal oxide support comprising an activated compound selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, and zirconia-titania.

The zeolite can be a natural or synthetic zeolite such as faujasite, chabazite, clinoptilolite, mordenite, silicalite, zeolite X, zeolite Y, ultrastable zeolite Y, ZSM-5 zeolite, ZSM-12 zeolite, SSZ-13 zeolite, SAPO5 zeolite, offretite, H beta zeolite or a beta zeolite. Specific zeolite adsorbent materials have a high silica to alumina ratio. The zeolite may have a silica/alumina molar ratio of from at least about 25/1, preferably at least about 50/1, with useful ranges of from about 25/1 to 1000/1, 50/1 to 500/1 as well as about 25/1 to 300/1, from about 100/1 to 250/1, or alternatively from about 35/1 to 180/1 is also exemplified. Preferred zeolites include ZSM-5, Y and beta zeolites. A particularly preferred adsorbent may comprise a beta zeolite of the type disclosed in U.S. Pat. No. 6,171,556. The zeolite loading on the monolith should not be smaller than 0.1 $g/in^3$ to guarantee sufficient HC storage capacity and to prevent a premature release of stored paraffins during the temperature ramp following low temperature storage. Preferably, zeolite content is in the range of about 0.4 to about 0.7 $g/in^3$. A premature release of aromatics and paraffins from the zeolite may cause a delay in the CO and HC light-off.

Reference to "impregnated" means that a precious metal-containing solution is put into pores of a material such as a zeolite or a non-zeolite-support. In detailed embodiments, impregnation of precious metals is achieved by incipient wetness, where a volume of diluted precious metal-containing solution is approximately equal to the pore volume of the support bodies. Incipient wetness impregnation generally leads to a substantially uniform distribution of the solution of the precursor throughout the pore system of the material. Other methods of adding precious metal are also known in the art and can be used.

Details of the components of a gas treatment article and system according to embodiments of the invention are provided below.

The Carrier

According to one or more embodiments, the carrier may be any of those materials typically used for preparing DOC catalysts and will preferably comprise a metal or ceramic honeycomb structure. Any suitable carrier may be employed, such as a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc.

Such monolithic carriers may contain up to about 900 or more flow passages (or "cells") per square inch of cross section, although far fewer may be used. For example, the carrier may have from about 50 to 600, more usually from about 200 to 400, cells per square inch ("cpsi"). The cells can have cross sections that are rectangular, square, circular, oval, triangular, hexagonal, or are of other polygonal shapes. Flow-through substrates typically have a wall thickness between 0.002 and 0.1 inches. Preferred flow-through substrates have a wall thickness of between 0.002 and 0.015 inches.

The ceramic carrier may be made of any suitable refractory material, e.g., cordierite, cordierite-α alumina, silicon nitride, silicon carbide, zircon mullite, spodumene, alumina-silica magnesia, zircon silicate, sillimanite, magnesium silicates, zircon, petalite, α-alumina, aluminosilicates and the like.

The carriers useful for the layered catalyst composites of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface of the aluminum-containing metal carriers may be oxidized at high temperatures, e.g., 1000° C. and higher, to improve the corrosion resistance of the alloy by forming an aluminum oxide layer on the surface the carrier. Such high temperature-induced oxidation may enhance the adherence of the refractory metal oxide support and catalytically-promoting metal components to the carrier.

For a catalyzed soot filter (CSF), the substrate may be a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces.

Specific wall flow substrates for use in the inventive system include thin porous walled honeycombs (monoliths) through which the fluid stream passes without causing too great an increase in back pressure or pressure drop across the article. Normally, the presence of a clean wall flow article will create a back pressure of 0.036 psi to 10 psi. Ceramic wall flow substrates used in the system are preferably formed of a material having a porosity of at least 40% (e.g., from 40 to 70%) having a mean pore size of at least 5 microns (e.g., from 5 to 30 microns). More preferably, the substrates have a porosity of at least 46% and have a mean pore size of at least 10 microns. When substrates with these porosities and these mean pore sizes are coated with the techniques described below, adequate levels of the CSF catalyst compositions can be loaded onto the substrates to achieve excellent $NO_x$ conversion efficiency and burning off of soot. These substrates are still able to retain adequate exhaust flow characteristics, i.e., acceptable back pressures, despite the CSF catalyst loading. Suitable wall flow substrates are for example disclosed in U.S. Pat. No. 4,329,162.

Figure 2:
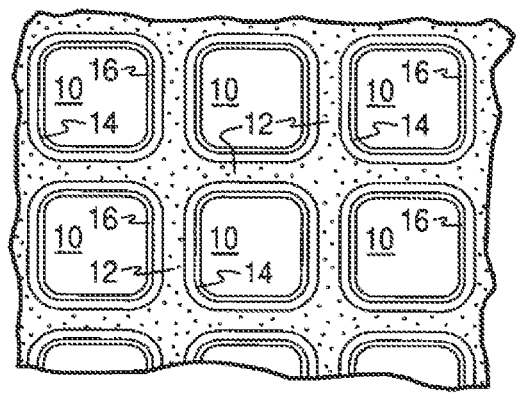
FIG. 2 is a partial cross-sectional view enlarged relative to FIG. 1 and taken along a plane parallel to the end faces of the carrier of FIG. 1, which shows an enlarged view of one of the gas flow passages shown in FIG. 1.

FIGS. 1 and 2. FIGS. 1 and 2 show an exemplary carrier member 2, in accordance with one embodiment of present invention. Referring to FIG. 1, the refractory carrier member 2 is a cylindrical shape having a cylindrical outer surface 4, an upstream end face 6 and a downstream end face 8, which is identical to end face 6. Carrier member 2 has a plurality of fine, parallel gas flow passages 10 formed therein. As seen in FIG. 2 flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2 walls 12 are so dimensioned and configured that gas flow passages 10 have a substantially regular polygonal shape, substantially square in the illustrated embodiment, but with rounded corners in accordance with U.S. Pat. No. 4,335,023, issued Jun. 15, 1982 to J. C. Dettling et al. A discrete bottom layer 14, which in the art and sometimes below is referred to as a "washcoat", is adhered or coated onto the walls 12 of the carrier member. As shown in FIG. 2, a second discrete top washcoat layer 16 is coated over the bottom washcoat layer 14.

As shown in FIG. 2, the carrier member include void spaces provided by the gas-flow passages 10, and the cross-sectional area of these passages 10 and the thickness of the walls 12 defining the passages will vary from one type of carrier member to another. Similarly, the weight of washcoat applied to such carriers will vary from case to case. Consequently, in describing the quantity of washcoat or catalytic metal component or other component of the composition, it is convenient to use units of weight of component per unit volume of catalyst carrier. Therefore, the units grams per cubic inch ("$g/in^3$") and grams per cubic foot ("$g/ft^3$") are used herein to mean the weight of a component per volume of the carrier member, including the volume of void spaces of the carrier member.

During operation, exhaust gaseous emissions from a lean burn engine comprising hydrocarbons, carbon monoxide, nitrogen oxides, and sulfur oxides initially encounter the top washcoat layer 16, and thereafter encounter the bottom washcoat layer 14.

Preparation of Catalyst Composites

The catalyst composites can be readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage therethrough of the gas stream being treated.

The catalyst composite can be readily prepared in layers on a monolithic carrier. For a first layer of a specific washcoat, finely divided particles of a high surface area refractory metal oxide are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 2.5 $g/in^3$ per dip. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Thereafter the coated carrier is calcined by heating, e.g., at 400-600° C. for about 10 minutes to about 3 hours. For the purposes of the present invention, the term "platinum component" means any compound, complex, or the like which, upon calcination or use thereof, decomposes or otherwise converts to a catalytically active form, usually the metal or the metal oxide. Typically, when palladium is desired, the palladium component is utilized in the form of a compound or complex to achieve dispersion of the component on the refractory metal oxide support, e.g., silica-alumina. For the purposes of the present invention, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or tetraammine palladium nitrate or platinum chloroplatinic acid, amine-solubilized platinum hydroxide, etc. During the calcination step, or at least during the initial phase of use of the composite, such compounds are converted into a catalytically active form of the metal or a compound thereof.

A suitable method of preparing any layer of the layered catalyst composite of the invention is to prepare a mixture of a solution of a desired precious metal compound (e.g., palladium compound) and at least one support, such as a finely divided, high surface area, refractory metal oxide support, e.g., silica-alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds or stabilizers, e.g., barium acetate, and a promoter, e.g., lanthanum nitrate, may be added to the slurry.

In one embodiment, the slurry is thereafter comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 20-60 wt %, more particularly about 30-40 wt %.

Additional layers, i.e., second and third layers may be prepared and deposited upon the first layer in the same manner as described above for deposition of the first layer upon the carrier.

Before describing several exemplary embodiments of the present invention, it is to be understood that the invention is not limited to the details of construction or process steps set forth in the following description. The invention is capable of other embodiments and of being practiced in various ways. In the following, preferred designs for the layered catalyst are provided, including such combinations as recited used alone or in unlimited combinations, the uses for which include systems and methods of other aspects of the present invention.

As previously discussed, the catalyst composition of the present invention comprises two layers in which two distinctly different compositions of platinum group metals are employed. The first or top washcoat layer comprises a zeolite, Pt and a refractory metal oxide support. In some embodiments, the top washcoat is substantially free of palladium. The second or bottom washcoat layer contains platinum and palladium in a Pt:Pd weight ratio of between 9:1 and 1:4. In one embodiment, the total precious metal component loading based on grams of precious metal per volume of monolith is from 5 to 500 g/ft$^3$, preferably 10 to 250 g/ft$^3$, preferably from 15 to 150 g/ft$^3$.

In one embodiment, the high Pt layer for NO oxidation and the lower Pt:Pd layer for CO/HC oxidation are reversed. Platinum and palladium are present in the top washcoat layer in a Pt:Pd weight ratio in a range from about 1:4 to 10:1, more specifically 1:1 to 5:1, and even more specifically about 1:1 to 2:1, and the bottom washcoat layer in this embodiment has a high Pt:Pd weight ratio from about 5:1 to 100:1, more specifically 5:1 to 10:1. The total loading of Pt and Pd in the bottom washcoat about 90 g/ft$^3$ and the total Pt and Pd loading in the top washcoat about 30 g/ft$^3$. The precious metal loading of this embodiment is useful for improving CO abatement while still maintaining improved NO oxidation.

In one or more embodiments, the total loading of platinum (Pt) in the top washcoat layer is in the range of about 10 g/ft$^3$ to 120 g/ft$^3$. In some embodiments, the total Pt in the top washcoat is in the range of about 60 g/ft$^3$ to 120 g/ft$^3$, or even in the range of about 10 to 60 g/ft$^3$. In some embodiments, the total loading of platinum and palladium in the top washcoat layer is in the range of about 70 g/ft$^3$ to 120 g/ft$^3$, or alternatively in the range of about 10 g/ft$^3$ to 60 g/ft$^3$. In one or more embodiments, the total loading of platinum in the bottom coat is in the range of about 5 g/ft$^3$ to 85 g/ft$^3$ and the total loading of palladium in the bottom coat is in the range of about 5 g/ft$^3$ to 50 g/ft$^3$. In one or more embodiments of the invention, the total combined platinum and palladium content of the top washcoat and bottom washcoat is present in a Pt:Pd weight ratio of about 4:1. In some embodiments, the composite contains a weight ratio of platinum group metal in the top layer to the bottom layer in the range of about 1:4 to 4:1. In one or more embodiments, the composite contains a weight ratio of platinum group metal in top layer to the bottom layer in the range of about 2:1 to 4:1, or alternatively in the range of about 1:3 to 1:1. In one or more embodiments, the bottom washcoat layer comprises Pt and Pd in a Pt:Pd weight ratio in the range of about 1:4 to 4:1. In other embodiments, the top washcoat layer comprises a Pt and Pd component in the weight ratio of Pt:Pd in the range of about 1:1 to 100:1.

In various embodiments, the components of the top and bottom washcoats described above may be inverted. For example, in one or more embodiments, the top washcoat comprises a Pt component and a Pd component in a weight ratio of Pt:Pd in the range of about 9:1 to 1:4. In other embodiments, the bottom washcoat layer comprises Pt and Pd in a weight ratio of Pt:Pd in the range of about 1:1 to 100:1. In one or more embodiments the bottom washcoat comprises barium oxide in the range of about 3-30 g/ft$^3$.

In some aspects of the invention, the composite may be adapted for oxidation of NO to $NO_2$. Specifically, the composite may be adapted for $NO_2$ formation in the range of about 40% to 60% of the total $NO_x$.

Emission Systems for Lean Burn Engines

Another aspect of the invention pertains to an emission treatment system comprising one or more components in addition to the catalyst composites described herein for the treatment of diesel exhaust gas emissions. An exemplary emission treatment system may be more readily appreciated by reference to FIG. 3, which depicts a schematic representation of an emission treatment system 32, in accordance with this embodiment of the present invention. Referring to FIG. 3, an exhaust gas stream containing gaseous pollutants (e.g., unburned hydrocarbons, carbon monoxide and $NO_x$) and particulate matter is conveyed via an exhaust transfer line 36 from a lean burn engine 34 such as a diesel engine to a diesel oxidation catalyst (DOC) 38, which is in the form of the catalyst composite according to embodiments of the present invention. In the DOC 38, unburned gaseous and volatile hydrocarbons (i.e., the VOF) and carbon monoxide are largely combusted to form carbon dioxide and water. In addition, a proportion of the NO of the $NO_x$ component may be oxidized to $NO_2$ in the DOC. The exhaust stream is next conveyed via exhaust line 40 to a catalyzed soot filter (CSF) 42, which traps particulate matter present within the exhaust gas stream. The CSF 42 is optionally catalyzed for passive regeneration. After removal of particulate matter, via CSF 42, the exhaust gas stream is conveyed via exhaust line 44. An ammonia precursor (e.g. aqueous urea) is injected via line 23 into the exhaust line 44. The exhaust gas stream with added ammonia is conveyed via line 44 to a downstream selective catalytic reduction (SCR) component 46 for the treatment and/or conversion of $NO_x$.

Another exemplary emission treatment system is shown in FIG. 4, which depicts a schematic representation of an emission treatment system 48, in accordance with an embodiment of the present invention. Referring to FIG. 4, an exhaust gas stream containing gaseous pollutants (e.g. unburned hydrocarbons, carbon monoxide and $NO_x$) and particulate matter is conveyed via exhaust line 36 from a lean burn engine 34 such as a diesel engine to a diesel oxidation catalyst (DOC) 38, which is in the form of the catalyst composite according to embodiments of the present invention. In the DOC 38, unburned gaseous and volatile hydrocarbons (i.e. the VOF) and carbon monoxide are largely combusted to form carbon dioxide and water. In addition, a proportion of the NO of the $NO_x$ component may be oxidized to $NO_2$ in the DOC. The exhaust stream is next conveyed via exhaust line 44. An ammonia precursor (e.g. aqueous urea) is injected via line 23 into the exhaust line 44. The exhaust gas stream with added ammonia is conveyed via line 44 to a selective catalytic reducer on a catalytic soot filter (SCRoF) 50, to trap particulate matter present within the exhaust gas stream and treat and/or convert $NO_x$. Optionally, the exhaust gas stream may be conveyed via line 52 to a downstream selective catalytic reducer (SCR) 53 for further treatment and/or conversion of $NO_x$.

Another exemplary emission treatment system is seen in FIG. 5, which depicts a schematic representation of an emission treatment system 54, in accordance with an embodiment of the present invention. Referring to FIG. 5, an exhaust gas stream containing gaseous pollutants (e.g. unburned hydrocarbons, carbon monoxide and $NO_x$) and particulate matter is conveyed via exhaust line 36 from a lean burn engine 34 such as a diesel engine to a diesel oxidation catalyst (DOC) 38, which is in the form of the catalyst composite according to embodiments of the present invention. In the DOC 38, unburned gaseous and non-volatile hydrocarbons (i.e. the VOF) and carbon monoxide are largely combusted to form carbon dioxide and water. In addition, a proportion of the NO of the $NO_x$ component may be oxidized to $NO_2$ in the DOC. The exhaust stream is next conveyed via exhaust line 44. An ammonia precursor (e.g. aqueous urea) is injected via line 23 into the exhaust line 44. The exhaust gas stream with added ammonia is conveyed via line 44 to a downstream selective catalytic reduction (SCR) component 56 for the treatment and/or conversion of $NO_x$. Optionally, the exhaust gas stream may be conveyed via line 58 to a catalyzed soot filter (CSF) 60 to trap particulate matter present within the exhaust stream.

The SCR catalyst (46, 50, 53 or 56) may be any composition that is effective to convert a $NO_x$ component to nitrogen through selective catalytic reduction with ammonia over the temperature range of about 150° C. to about 600° C. Suitable catalysts include vanadium oxide supported on W-doped titania or zeolites promoted with a base metal such as copper and/or iron. Suitable zeolites include ZSM-5, Beta, USY, CHA, etc. Specific embodiments are directed to zeolites having 8-ring pore openings and double-six ring secondary building units, for example, those having the following structure types: AEI, AFT, AFX, CHA, EAB, ERU, KFI, LEV, SAS, SAT, and SAV. According to one or more embodiments, it will be appreciated that by defining the zeolites by their structure type, it is intended to include the structure type and any and all isotypic framework materials such as SAPO, ALPO and MeAPO materials having the same structure type. In more specific, embodiments, reference to an aluminosilicate zeolite structure type limits the material to zeolites that do not include phosphorus or other metals substituted in the framework. Of course, aluminosilicate zeolites may be subsequently ion-exchanged with one or more promoter metals such as iron, copper, manganese, cobalt, nickel, cerium or platinum group metals. However, to be clear, as used herein, "aluminosilicate zeolite" excludes aluminophosphate materials such as SAPO, ALPO, and MeAPO materials, and the broader term "zeolite" is intended to include aluminosilicates and silica-alumina-phosphate oxides (SAPO).

In specific system embodiments, when a base metal promoted small pore zeolite with 8 member-ring pore openings (~3.8 Angstroms) accessible through its 3-dimensional porosity is used as the zeolite for the SCR catalyst, it is possible to integrate the SCR catalyst with the CSF. To be more specific, the CSF, which is in the form of a wall flow filter, is loaded with a washcoat of a copper and/or iron promoted small pore zeolite with 8 member ring openings. In specific embodiments, the zeolite has the CHA crystal structure. The loading of the copper and/or iron promoted zeolite on the wall flow filter can range from 0.5 g/ft$^3$ to 2.4 g/ft$^3$. In specific embodiments, loadings of 0.5 g/ft$^3$, 0.6 g/ft$^3$, 0.7 g/ft$^3$, 0.8 g/ft$^3$, 0.9 g/ft$^3$, 1.0 g/ft$^3$, 1.1 g/ft$^3$, 1.2 g/ft$^3$, 1.3 g/ft$^3$, 1.4 g/ft$^3$, 1.5 g/ft$^3$, 2.4 g/ft$^3$ are exemplified. In some embodiments it may be possible for the downstream SCR catalyst 53 to be eliminated from the system, thus reducing the footprint of the overall system configuration because fewer components are used. In specific embodiments, the washcoat is in the form of a slurry-loaded washcoat obtained from the application of suspension of solid particles of the zeolite in a liquid vehicle such as water, which is applied to the wall flow filter such that the washcoat can be on the surface of and/or permeate the filter walls.

The diesel oxidation catalyst composite according to the present invention is readily applicable to various emissions treatment systems. According to the present invention, the DOC composite with improved NO oxidation may be employed in a DOC+CSF or DOC+CSF+SCR system for passive soot burning, a DOC+SCR or DOC+SCR+CSF system for enhancing SCR performance, with Fe and or Cu-zeolite SCR catalysts, or a DOC+SCR on a catalyzed soot filter (DOC+SCRoF) system for improving SCRoF performance.

EXAMPLES

The following non-limiting examples shall serve to illustrate various embodiments of the present invention. In each of the examples, the carrier was cordierite. Reference to a top washcoat and a bottom washcoat provides no limitation to the location of the coat on the carrier.

Example 1

An oxidation catalyst composite was prepared having two layers: a bottom washcoat layer and a top washcoat layer. The layered catalyst composite contained palladium and platinum with a total precious metal loading of about 120 g/ft$^3$ and with a nominal Pt/Pd/Rh weight ratio of about 4/1/0. The substrate had a volume of 5.3 in³ (0.09 L), a cell density of 400 cells per square inch, and a wall thickness of approximately 100 μm. The layers were prepared as follows:

Bottom Washcoat Layer

The components present in the bottom washcoat layer were high surface area (180 m²/g) silica-alumina, barium hydroxide (~1.7% by dry weight), Pt (~1% by dry weight), and Pd (~1% by dry weight) with a nominal Pt/Pd weight ratio of 1/1. The total loading of the bottom washcoat layer was 1.6 g/in³.

Palladium in the form of a palladium nitrate solution and platinum in the form of an amine salt were impregnated onto the silica-alumina by planetary mixer (P-mixer) to form a wet powder while achieving incipient wetness. An aqueous slurry was formed by combining the silica-alumina with water (45-50% solids slurry) and acid to pH <4.5, and milling to a particle size of 90% less than 8 microns. The slurry was coated onto a cordierite carrier using deposition methods known in the art for depositing the catalyst on a cordierite substrate. After coating, the carrier plus the bottom washcoat layer were dried and then calcined at a temperature of 450° C. for about 1 hour.

Top Washcoat Layer

The components present in the top washcoat layer were a high surface area silica-alumina, a H Beta zeolite (~42% by dry weight), a suitable binder (~4% by dry weight) and Pt (~6% by dry weight), with a nominal Pt/Pd weight ratio of 1:0. The total loading of the outer layer was 1.2 g/in³.

Platinum in the form of an amine salt was impregnated onto the silica-alumina by planetary mixer (P-mixer) to form a wet powder while achieving incipient wetness. An aqueous slurry of the silica-alumina was formed, using an acid to reduce the pH to <4.5. The slurry was milled to a particle size of 90% less than 16 microns. The zeolite was added to the slurry. The slurry was then milled to a particle size of 90% less than 10 microns. The binder was added to the slurry. The slurry was coated onto the cordierite carrier over the bottom washcoat layer using deposition methods known in the art for depositing the catalyst on a cordierite substrate. After coating, the carrier plus the bottom washcoat and top washcoat layers were dried, and then calcined at a temperature of 450° C. for about 1 hour.

Example 2

An oxidation catalyst composite was prepared having two layers: a bottom washcoat layer and a top washcoat layer. The layered catalyst composite contained palladium and platinum with total precious metal loading of about 120 g/ft³ and with a nominal Pt/Pd/Rh weight ratio of about 4/1/0. The substrate had a volume of 5.3 in³ (0.09 L), a cell density of 400 cells per square inch, and a wall thickness of approximately 100 μm. The layers were prepared as follows:

Bottom Washcoat Layer

The components present in the bottom washcoat layer were high surface area (180 m²/g) silica-alumina, barium hydroxide (~1.7% by dry weight), Pt (~2.2% by dry weight), and Pd (~0.9% by dry weight) with a nominal Pt:Pd weight ratio of 2.5:1. The total loading of the bottom washcoat layer was 1.6 g/in³.

Palladium in the form of a palladium nitrate solution and platinum in the form of an amine salt were impregnated onto the silica-alumina by planetary mixer (P-mixer) to form a wet powder while achieving incipient wetness. An aqueous slurry was formed by combining the silica-alumina with water (45-50% solids slurry) and acid to pH <4.5, and milling to a particle size of 90% less than 8 microns. The slurry was coated onto a cordierite carrier using deposition methods known in the art for depositing the catalyst on a cordierite substrate. After coating, the carrier plus the bottom washcoat layer were dried and then calcined at a temperature of 450° C. for about 1 hour.

Top Washcoat Layer

The components present in the top washcoat layer were a high surface area silica-alumina, a H Beta zeolite, a suitable binder (~4% by dry weight), and Pt (~3.5% by dry weight) with a nominal Pt:Pd weight ratio of 1:0. The total loading of the top washcoat layer was 1.2 g/in³.

Platinum in the form of an amine salt was impregnated onto the silica-alumina by planetary mixer (P-mixer) to form a wet powder while achieving incipient wetness. An aqueous slurry of the silica-alumina was formed, using an acid to reduce the pH to <4.5. The slurry was milled to a particle size of 90% less than 16 microns. The zeolite was then added to the slurry. The slurry was then milled to a particle size of 90% less than 10 microns. The binder was added to the slurry. The slurry was coated onto the cordierite carrier over the bottom washcoat layer using deposition methods known in the art for depositing the catalyst on a cordierite substrate. After coating, the carrier plus the bottom washcoat and top washcoat layers were dried, and then calcined at a temperature of 450° C. for about 1 hour.

Example 3

An oxidation catalyst composite was prepared having two layers: a bottom washcoat layer and a top washcoat layer. The layered catalyst composite contained palladium and platinum with total precious metal loading of about 120 g/ft³ and with a nominal Pt/Pd/Rh weight ratio of about 4/1/0. The substrate had a volume of 5.3 in³ (0.09 L), a cell density of 400 cells per square inch, and a wall thickness of approximately 100 μm. The layers were prepared as follows:

Bottom Washcoat Layer

The components present in the bottom washcoat layer were high surface area (180 m²/g) silica-alumina, barium hydroxide (~1.7% by dry weight), Pt (~0.2% by dry weight), and Pd (~0.9% by dry weight) with a nominal Pt/Pd weight ratio of 1/4. The total loading of the bottom washcoat layer was 1.6 g/in³.

Palladium in the form of a palladium nitrate solution and platinum in the form of an amine salt were impregnated onto the silica-alumina by planetary mixer (P-mixer) to form a wet powder while achieving incipient wetness. An aqueous slurry of the silica-alumina was formed, using an acid to reduce the pH to <4.5, and milling to a particle size of 90% less than 8 microns. The slurry was coated onto a cordierite carrier using deposition methods known in the art for depositing the catalyst on a cordierite substrate. After coating, the carrier plus the bottom washcoat layer were dried and then calcined at a temperature of 450° C. for about 1 hour.

Top Washcoat Layer

The components present in the top washcoat layer were a high surface area silica-alumina, H Beta zeolite, a suitable binder (~4% by dry weight), and a mixture of Pt (~8% by dry weight), with a nominal Pt:Pd weight ratio of 1:0. The total loading of the top washcoat layer was 1.2 g/in³.

Platinum in the form of an amine salt was impregnated onto the silica-alumina by planetary mixer (P-mixer) to form a wet powder while achieving incipient wetness. An aqueous slurry of the silica-alumina was formed, using an acid to reduce the pH to <4.5. The slurry was milled to a particle size of 90% less than 16 microns. The zeolite was then added to the slurry. The slurry was then milled to a particle size of 90% less than 10 microns. The binder was added to the slurry. The slurry was coated onto the cordierite carrier over the bottom washcoat layer using deposition methods known in the art for depositing the catalyst on a cordierite substrate. After coating, the carrier plus the bottom washcoat and top washcoat layers were dried, and then calcined at a temperature of 450° C. for about 1 hour.

Example 4

An oxidation catalyst composite was prepared having two layers: a bottom washcoat layer and a top washcoat layer. The layered catalyst composite contained palladium and platinum with total precious metal loading of about 120 g/ft$^3$ and with a nominal Pt/Pd/Rh weight ratio of about 4/1/0. The substrate had a volume of 5.3 in$^3$ (0.09 L), a cell density of 400 cells per square inch, and a wall thickness of approximately 100 µm. The layers were prepared as follows:

Bottom Washcoat Layer

The components present in the bottom washcoat layer were high surface area (180 m$^2$/g) silica-alumina, barium hydroxide (~0.6% by dry weight), Pt (~2.8% by dry weight), and Pd (~0.3% by dry weight) with a nominal Pt:Pd weight ratio of about 9:1. The total loading of the bottom washcoat layer was 1.6 g/in$^3$.

Palladium in the form of a palladium nitrate solution and platinum in the form of an amine salt were impregnated onto the silica-alumina by planetary mixer (P-mixer) to form a wet powder while achieving incipient wetness. An aqueous slurry of the silica-alumina was formed, using an acid to reduce the pH to <4.5 and milling to a particle size of 90% less than 8 microns. The slurry was coated onto a cordierite carrier using deposition methods known in the art for depositing the catalyst on a cordierite substrate. After coating, the carrier plus the bottom washcoat layer were dried and then calcined at a temperature of 450° C. for about 1 hour.

Top Washcoat Layer

The components present in the top washcoat layer were a high surface area silica-alumina, a H Beta zeolite, a suitable binder (~4% by dry weight), barium hydroxide (~1.4% by dry weight), Pd (~0.7% by dry weight) and Pt (~0.7% by dry weight) with a nominal Pt:Pd weight ratio of about 1:1. The total loading of the top washcoat layer was about 1.2 g/in$^3$.

Palladium in the form of a palladium nitrate solution and platinum in the form of an amine salt were impregnated onto the silica-alumina by planetary mixer (P-mixer) to form a wet powder while achieving incipient wetness. The slurry was milled to a particle size of 90% less than 16 microns. The zeolite was then added to the slurry. The slurry was then milled to a particle size of 90% less than 10 microns. The binder was added to the slurry. The slurry was coated onto the cordierite carrier over the bottom washcoat layer using deposition methods known in the art for depositing the catalyst on a cordierite substrate. After coating, the carrier plus the bottom washcoat and top washcoat layers were dried, and then calcined at a temperature of 450° C. for about 1 hour.

Comparative Example 5

A comparative oxidation catalyst composite was prepared having two layers: a top washcoat layer and a bottom washcoat layer. The layered catalyst composite contained palladium and platinum with a total precious metal loading of about 120 g/ft$^3$ and with a nominal Pt/Pd/Rh weight ratio of 4/1/0. The substrate had a volume of 5.3 in$^3$ (0.09 L), a cell density of 400 cells per square inch, and a wall thickness of approximately 100 µm. The layers were prepared as follows:

Bottom Washcoat Layer

The components present in the bottom washcoat layer were high surface area (180 m$^2$/g) silica-alumina, barium hydroxide (~1% by dry weight), and precious metals of platinum (~2.3% by dry weight) and palladium (~0.6% by dry weight) with a nominal Pt/Pd weight ratio of 4/1. The total loading of the bottom washcoat layer was about 1.2 g/in$^3$.

Palladium in the form of a palladium nitrate solution and platinum in the form of an amine salt were impregnated onto the silica-alumina by planetary mixer (P-mixer) to form a wet powder while achieving incipient wetness. An aqueous slurry was then formed, using an acid to reduce the pH. The slurry was milled to a particle size of 90% less than approximately 10 microns. The slurry was coated onto the cordierite carrier using deposition methods known in the art for depositing the catalyst on a cordierite substrate. After coating, the carrier plus the bottom washcoat layer were dried, and then calcined.

Top Washcoat Layer

The components present in the top washcoat layer were high surface area (180 m$^2$/g) silica-alumina, a H Beta zeolite, a binder (~3% of dry weight), barium hydroxide (~0.9% by dry weight), and precious metals of platinum (~2.8% by dry weight) and palladium (~0.7% by dry weight) with a nominal Pt/Pd weight ratio of 4/1. The total loading of the top washcoat layer was 1.6 g/in$^3$.

Palladium in the form of a palladium nitrate solution and platinum in the form of an amine salt were impregnated onto the silica-alumina by planetary mixer (P-mixer) to form a wet powder while achieving incipient wetness. An aqueous slurry was then formed, using an acid to reduce the pH. The slurry was milled to a particle size of 90% less than 16 microns. The zeolite was then added to the slurry. The slurry was then milled to a particle size of 90% less than 10 microns. The binder was added to the slurry. The slurry was coated onto the cordierite carrier over the bottom washcoat layer using deposition methods known in the art for depositing the catalyst on a cordierite substrate. After coating, the carrier plus the bottom washcoat and top washcoat layers were dried, and then calcined at a temperature of 450° C. for about 1 hour.

Example 6

An oxidation catalyst composite was prepared having two layers: a bottom washcoat layer and a top washcoat layer. The layered catalyst composite contained palladium and platinum with total precious metal loading of about 120 g/ft$^3$ and with a nominal Pt/Pd/Rh weight ratio of about 4/1/0. The substrate had a volume of 5.3 in$^3$ (0.09 L), a cell density of 400 cells per square inch, and a wall thickness of approximately 100 µm. The layers were prepared as follows:

Bottom Washcoat Layer

The components present in the bottom washcoat layer were high surface area (180 m$^2$/g) silica-alumina and Pt (~3.3% by dry weight) with a nominal Pt/Pd weight ratio of 1/0. The total loading of the bottom washcoat layer was 1.6 g/in$^3$.

Platinum in the form of an amine salt were impregnated onto the silica-alumina by planetary mixer (P-mixer) to form a wet powder while achieving incipient wetness. An aqueous slurry of the silica-alumina was formed, using an acid to reduce the pH to <4.5, and milling to a particle size of 90% less than 8 microns. The slurry was coated onto a cordierite carrier using deposition methods known in the art for depositing the catalyst on a cordierite substrate. After coating, the carrier plus the bottom washcoat layer were dried and then calcined at a temperature of 450° C. for about 1 hour.

Top Washcoat Layer

The components present in the top washcoat layer were a high surface area silica-alumina, H Beta zeolite, a suitable binder (~4% by dry weight), barium hydroxide (~2.3% by dry weight), Pt (~0.6% by dry weight), and Pd (~2.3% by dry weight), with a nominal Pt:Pd weight ratio of 1:4. The total loading of the top washcoat layer was 1.2 g/in$^3$.

Palladium in the form of a palladium nitrate solution and platinum in the form of an amine salt was impregnated onto the silica-alumina by planetary mixer (P-mixer) to form a wet powder while achieving incipient wetness. An aqueous slurry of the silica-alumina was formed, using an acid to reduce the pH to <4.5. The slurry was milled to a particle size of 90% less than 16 microns. The zeolite was then added to the slurry. The slurry was then milled to a particle size of 90% less than 10 microns. The binder was added to the slurry. The slurry was coated onto the cordierite carrier over the bottom washcoat layer using deposition methods known in the art for depositing the catalyst on a cordierite substrate. After coating, the carrier plus the bottom washcoat and top washcoat layers were dried, and then calcined at a temperature of 450° C. for about 1 hour.

Example 7

An oxidation catalyst composite was prepared having two layers: a bottom washcoat layer and a top washcoat layer. The layered catalyst composite contained palladium and platinum with total precious metal loading of about 120 g/ft$^3$ and with a nominal Pt/Pd/Rh weight ratio of about 4/1/0. The substrate had a volume of 5.3 in$^3$ (0.09 L), a cell density of 400 cells per square inch, and a wall thickness of approximately 100 μm. The layers were prepared as follows:

Bottom Washcoat Layer

The components present in the bottom washcoat layer were high surface area (180 m$^2$/g) silica-alumina, barium hydroxide (~1.0% by dry weight) Pt (~0.5% by dry weight), and Pd (~0.5% by dry weight) with a nominal Pt:Pd weight ratio of 1:1. The total loading of the bottom washcoat layer was 1.6 g/in$^3$.

Palladium in the form of a palladium nitrate solution and platinum in the form of an amine salt were impregnated onto the silica-alumina by planetary mixer (P-mixer) to form a wet powder while achieving incipient wetness. An aqueous slurry of the silica-alumina was formed, using an acid to reduce the pH to <4.5, and milling to a particle size of 90% less than 8 microns. The slurry was coated onto a cordierite carrier using deposition methods known in the art for depositing the catalyst on a cordierite substrate. After coating, the carrier plus the bottom washcoat layer were dried and then calcined at a temperature of 450° C. for about 1 hour.

Top Washcoat Layer

The components present in the top washcoat layer were a high surface area silica-alumina, H Beta zeolite, a suitable binder (~4% by dry weight), barium hydroxide (0.8% by dry weight), Pt (~7.8% by dry weight), and Pd (~0.9% by dry weight), with a nominal Pt:Pd weight ratio of 9:1. The total loading of the top washcoat layer was 1.2 g/in$^3$.

Palladium in the form of a palladium nitrate solution and platinum in the form of an amine salt was impregnated onto the silica-alumina by planetary mixer (P-mixer) to form a wet powder while achieving incipient wetness. An aqueous slurry of the silica-alumina was formed, using an acid to reduce the pH to <4.5. The slurry was milled to a particle size of 90% less than 16 microns. The zeolite was then added to the slurry. The slurry was then milled to a particle size of 90% less than 10 microns. The binder was added to the slurry. The slurry was coated onto the cordierite carrier over the bottom washcoat layer using deposition methods known in the art for depositing the catalyst on a cordierite substrate. After coating, the carrier plus the bottom washcoat and top washcoat layers were dried, and then calcined at a temperature of 450° C. for about 1 hour.

Example 8

Testing

The composites of examples 1-5 were tested as follows. Catalyst composites of size 1"×3" were aged with laboratory oven aging at approximately 800° C., 10% steam for 16 hours. After aging, the layered catalysts of Examples 1-5 were tested using a EURO 5 test cycle in a transient lab reactor. The average formation of NO$_2$ and conversion of CO measured are reported in Table 1.

TABLE 1

| | NO$_2$/NO$_x$ & CO Performance | |
|---|---|---|
| EXAMPLE | NO$_2$/NO$_x$ (915-970 sec in NEDC), % | CO Conversion, % |
| COMP. 5 (Fresh) | 79% | 92% |
| COMP. 5 (Aged) | 59% | 87% |
| 3 (Aged) | 93% | 81% |
| 1 (Aged) | 83% | 84% |
| 2 (Aged) | 79% | 87% |
| 4 (Aged) | 71% | 85% |
| 6 (Aged) | 80% | 84% |
| 7 (Aged) | 75% | 84% |

The test results in Table 1 indicate the benefits of using a catalyst having a top washcoat layer comprising Pt substantially free of Pd, and a zeolite. For each of catalyst composites described in Examples 1-7, there was a marked improvement of NO$_2$ formation over the aged reference of Example 5. Notably, all of aged Examples 1-4 and 6-7 had at least as efficient NO$_2$ formation as fresh reference Example 5. Additionally, CO conversion efficiency was not substantially altered in aged Examples 1-7 when compared to the aged reference Example 5.

Example 9

Testing

The composites of examples 1, 2 and 5 were further tested as follows. Catalyst composites of size 1.5"×4" were aged with laboratory oven aging at approximately 800° C., 10% steam for 16 hours. After aging, the layered catalysts of Examples 1, 2 and 5 were tested in a transient laboratory reactor using a DOC and SCRoF System. The SCRoF used in conjunction with DOC is a wall flow filter loaded with 1.5 g/in$^3$ of a CuCHA zeolite. There was no separate SCR catalyst downstream from the SCR on the wall flow filter (SCRoF). The average deNO$_x$ performance is reported in Table 2.

TABLE 2 deNO$_x$ Performance of DOC + SCRoF, %

| EXAMPLE | deNO$_x$ Performance of SCRoF, % |
|---|---|
| COMP. 5 (Fresh) | 71% |
| COMP. 5 (Aged) | 59% |
| 2 (Aged) | 74% |
| 1 (Aged) | 70% |

These test results in Table 2 again indicate the benefits of using a catalyst having a top washcoat layer comprising Pt substantially free of Pd, and a zeolite. For each of catalyst composites described in Examples 1 and 2, there was a marked improvement of deNO$_x$ performance of the DOC+SCRoF system over the aged reference of Example 5. Notably, both of aged Examples 1 and 2 had an approximately equal deNO$_x$ performance as the fresh reference Example 5.

Examples 1-2 also showed the viability of a system comprised of a DOC catalyst composite in accordance with embodiments of the invention with a downstream SCR catalyst loaded on a wall flow filter (SCRoF), with no further downstream SCR catalyst or filter catalyzed with a platinum group metal. Consolidation of the system and reduction in size are thus possible.

Example 10

Testing

The composites of examples 1-7 were further tested as follows. Full sized catalyst composites (5.66"D×4"L) were oven aged at approximately 800° C., 10% steam for 16 hours. After aging, the layered catalysts of Examples 1-5 were tested on a 2.0 L diesel engine. The average NO$_2$ formation, CO conversion, and HC conversion performance on the regulated European NEDC drive cycle is reported in Table 3.

TABLE 3

NO$_2$ Formation, CO Conversion, and HC Conversion

| DOC Catalyst | NO$_2$/NO$_x$ (915-970 sec. in NEDC), % | CO Conversion, % | HC Conversion, % |
|---|---|---|---|
| COMP. 5 (Aged) | 31% | 85% | 91% |
| 1 (Aged) | 57% | 85% | 93% |
| 2 (Aged) | 50% | 88% | 94% |
| 3 (Aged) | 64% | 79% | 91% |
| 4 (Aged) | 51% | 86% | 93% |
| 6 (Aged) | 53% | 82% | 90% |
| 7 (Aged) | 57% | 83% | 92% |

These vehicle conversion test results in Table 3 indicate again the benefits of using a catalyst having a top washcoat layer comprising Pt substantially free of Pd, and a zeolite. For each of catalyst composites described in Examples 1-4 and 6-7, there was a marked improvement of NO$_2$ formation over the aged reference of Example 5. Additionally, each of the aged catalyst composites in Examples 1-7 had either an equivalent, or only modest reduction, in CO conversion when compared to the aged reference of Comparative Example 5. Furthermore, the HC conversion of aged Examples 1-7 was approximately equal to the aged reference of Example 5.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The invention has been described with specific reference to the embodiments and modifications thereto described above. Further modifications and alterations may occur to others upon reading and understanding the specification. It is intended to include all such modifications and alterations insofar as they come within the scope of the invention.

What is claimed is:

1. An oxidation catalyst composite for abatement of exhaust gas emissions from a lean burn engine comprising:
   a carrier substrate having a length, an inlet end and an outlet end, an oxidation catalyst catalytic material on the carrier, the oxidation catalyst catalytic material including a bottom washcoat layer and a top washcoat layer;
   the bottom washcoat layer comprising a refractory metal oxide support, a platinum (Pt) component and a palladium (Pd) component in weight ratio of Pt to Pd in the range of about 4:1 to 1:4; and
   the top washcoat layer comprising a zeolite, Pt and a refractory metal oxide support, the top washcoat layer being substantially free of palladium, the oxidation catalyst composite being effective to abate hydrocarbon and carbon monoxide, and oxidize NO to NO$_2$ in the lean burn engine exhaust; and wherein the top washcoat layer contains a higher loading of platinum group metals than the bottom washcoat layer to maximize NO oxidation.

2. The oxidation catalyst of claim 1, wherein the top washcoat layer is substantially free of barium and the bottom washcoat layer is substantially free of zeolite.

3. The oxidation catalyst of claim 1, wherein the refractory metal oxide support comprises silica-alumina.

4. The oxidation catalyst of claim 1, wherein the top washcoat layer comprises a Pt component in an amount in the range of about 10 g/ft$^3$ to 120 g/ft$^3$.

5. The oxidation catalyst of claim 4, wherein the bottom washcoat layer comprises a Pt component in an amount in the range of about 5 g/ft$^3$ to 85 g/ft$^3$ and comprises a Pd component in an amount in the range of about 5 g/ft$^3$ to 50 g/ft$^3$.

6. The oxidation catalyst of claim 1, wherein the composite contains a weight ratio of platinum group metal in the top layer to the bottom layer in the range of 1:1 to 4:1.

7. The oxidation catalyst of claim 6, wherein the top washcoat comprises platinum in the range of about 60 to 120 g/ft$^3$ and the bottom washcoat layer comprises platinum and palladium in a weight ratio of about 1:4 to 1:1.

8. An oxidation catalyst composite for abatement of exhaust gas emissions from a lean burn engine comprising:
a carrier substrate having a length, an inlet end and an outlet end, an oxidation catalyst catalytic material on the carrier, the oxidation catalyst catalytic material including a bottom washcoat layer and a top washcoat layer;
the bottom washcoat layer comprising a refractory metal oxide support, a platinum (Pt) component and palladium (Pd) component in the weight ratio of Pt to Pd in the range of about 9:1 to 1:4; and
the top washcoat layer comprising a zeolite, a refractory metal oxide support, a platinum component (Pt) and palladium component (Pd) in the weight ratio of Pt to Pd in the range of about 1:1 to 100:1, the oxidation catalyst composite being effective to abate hydrocarbon and carbon monoxide, and oxidize NO to $NO_2$ in the lean burn engine exhaust.

9. The oxidation catalyst of claim 8, wherein the top washcoat further comprises barium oxide in the range of about 3-30 $g/ft^3$.

10. The oxidation catalyst of claim 8, wherein the top washcoat layer contains a lower loading of platinum group metals than the bottom washcoat layer to maximize CO and HC oxidation.

11. An oxidation catalyst composite for abatement of exhaust gas emissions from a lean burn engine comprising:
a carrier substrate having a length, an inlet end and an outlet end, an oxidation catalyst catalytic material on the carrier, the oxidation catalyst catalytic material including a bottom washcoat layer and a top washcoat layer;
the top washcoat layer comprising a refractory metal oxide, zeolite and a platinum component (Pt) and a palladium component (Pd) in a weight ratio of Pt to Pd in the range of about 9:1 to 1:4; and
the bottom washcoat layer comprising Pt and a refractory metal oxide support, the oxidation catalyst composite being effective to abate hydrocarbon and carbon monoxide, and oxidize NO to $NO_2$ in the lean burn engine exhaust.

12. The oxidation catalyst of claim 11, wherein the bottom washcoat layer is substantially free of palladium and substantially free of barium.

13. The oxidation catalyst of claim 11, wherein the bottom washcoat layer further comprises a palladium component, the platinum component and palladium component present in a weight ratio of Pt to Pd in the range of about 1:1 to 100:1.

14. The oxidation catalyst of claim 11, wherein the bottom washcoat layer further comprises barium oxide in the range of about 3-30 $g/ft^3$.

15. A method of treating exhaust gas from a lean burn engine comprising flowing the exhaust gas through a honeycomb substrate coated with an oxidation catalyst composite of claim 1 wherein the diesel oxidation catalyst is effective to abate CO and HC, and oxidize NO to $NO_2$ from the exhaust gas stream.

16. A method of treating exhaust gas from a lean burn engine comprising flowing the exhaust gas through a honeycomb substrate coated with an oxidation catalyst composite of claim 8 wherein the diesel oxidation catalyst is effective to abate CO and HC, and oxidize NO to $NO_2$ from the exhaust gas stream.

17. A method of treating exhaust gas from a lean burn engine comprising flowing the exhaust gas through a honeycomb substrate coated with an oxidation catalyst composite of claim 11 wherein the diesel oxidation catalyst is effective to abate CO and HC, and oxidize NO to $NO_2$ from the exhaust gas stream.

18. A system for treatment of a lean burn engine exhaust gas emission including hydrocarbons, carbon monoxide, and other exhaust components, the emission treatment system comprising:
an exhaust conduit in fluid communication with the lean burn engine via an exhaust manifold;
the oxidation catalyst composite of claim 1 wherein the carrier substrate is a flow through substrate or a wall-flow substrate; and
a catalyzed soot filter and an SCR catalyst composition are located downstream from the oxidation catalyst composite.

19. The system of claim 18, wherein the SCR catalyst composition is loaded on the catalyzed soot filter.

20. The system of claim 18, wherein the SCR catalyst composition comprises vanadium oxide supported on W-doped titania or an iron or copper promoted small pore zeolite with 8 member ring openings.

21. The system of claim 20, wherein the small pore zeolite has the CHA structure.

22. A system for treatment of a lean burn engine exhaust gas emission including hydrocarbons, carbon monoxide, and other exhaust components, the emission treatment system comprising:
an exhaust conduit in fluid communication with the lean burn engine via an exhaust manifold;
the oxidation catalyst composite of claim 8 wherein the carrier substrate is a flow through substrate or a wall-flow substrate; and
a catalyzed soot filter and an SCR catalyst composition are located downstream from the oxidation catalyst composite.

23. A system for treatment of a lean burn engine exhaust gas emission including hydrocarbons, carbon monoxide, and other exhaust components, the emission treatment system comprising:
an exhaust conduit in fluid communication with the lean burn engine via an exhaust manifold;
the oxidation catalyst composite of claim 11 wherein the carrier substrate is a flow through substrate or a wall-flow substrate; and
a catalyzed soot filter and an SCR catalyst composition are located downstream from the oxidation catalyst composite.

* * * * *